Dec. 8, 1970          O. MITCHELL          3,545,063
METHOD OF ASSEMBLING AN EVAPORATOR HAVING A HELICAL CHANNEL
Filed Dec. 17, 1968          2 Sheets-Sheet 1
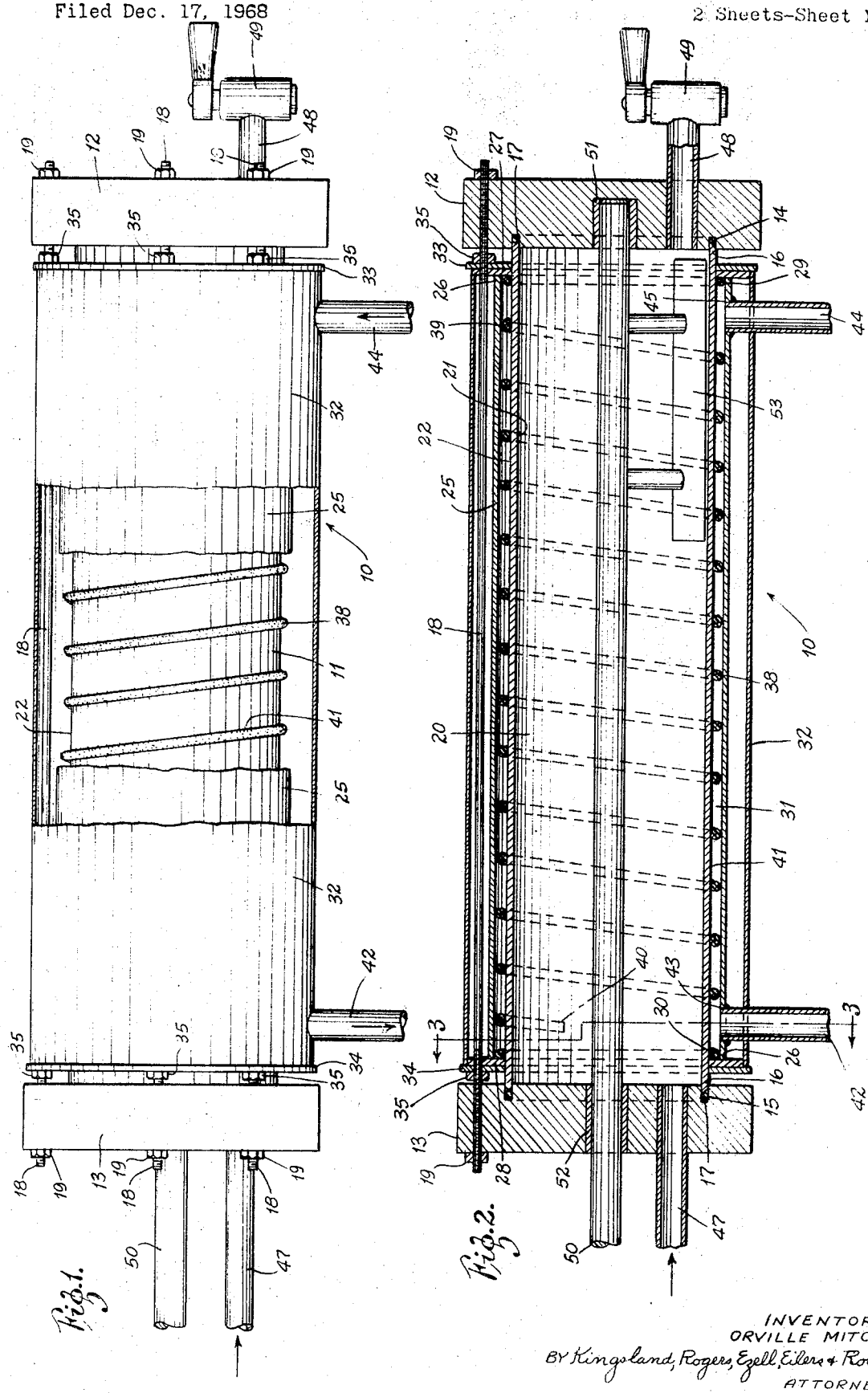
INVENTOR:
ORVILLE MITCHELL
BY Kingsland, Rogers, Ezell, Eilers & Robbins
ATTORNEYS Dec. 8, 1970     O. MITCHELL     3,545,063
METHOD OF ASSEMBLING AN EVAPORATOR HAVING A HELICAL CHANNEL
Filed Dec. 17, 1968     2 Sheets-Sheet 2
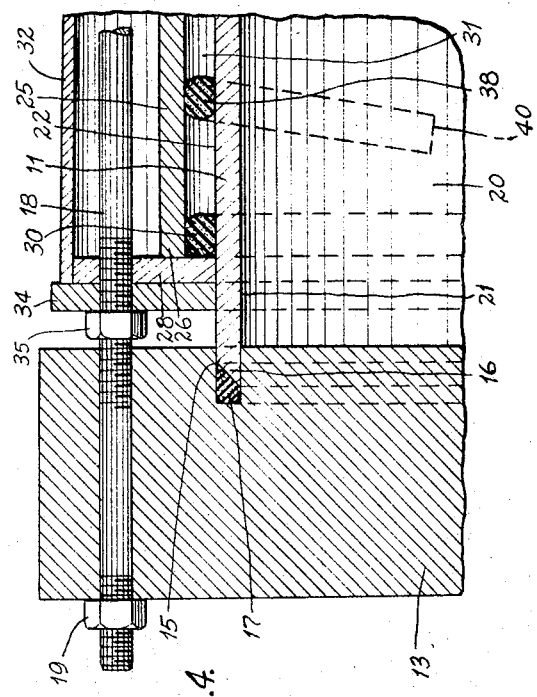
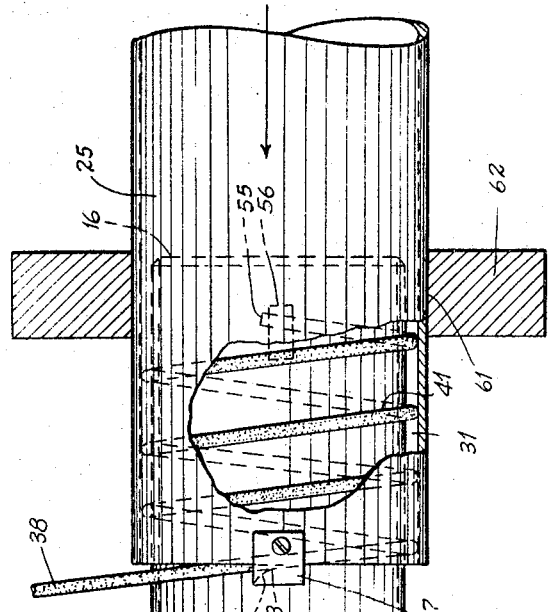
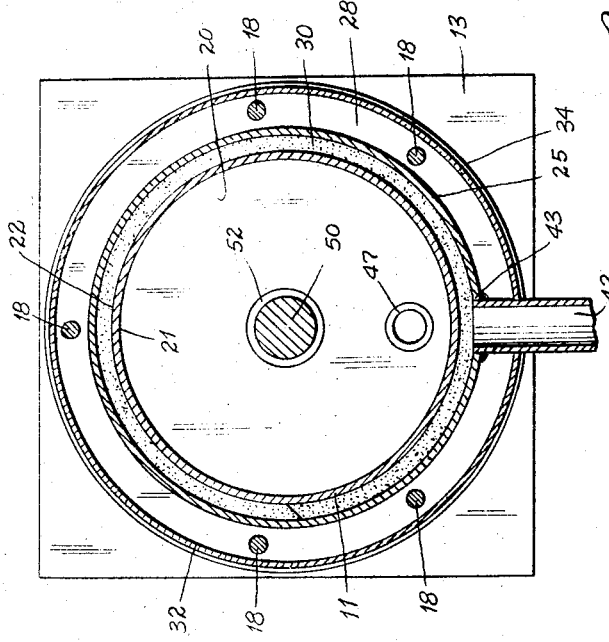
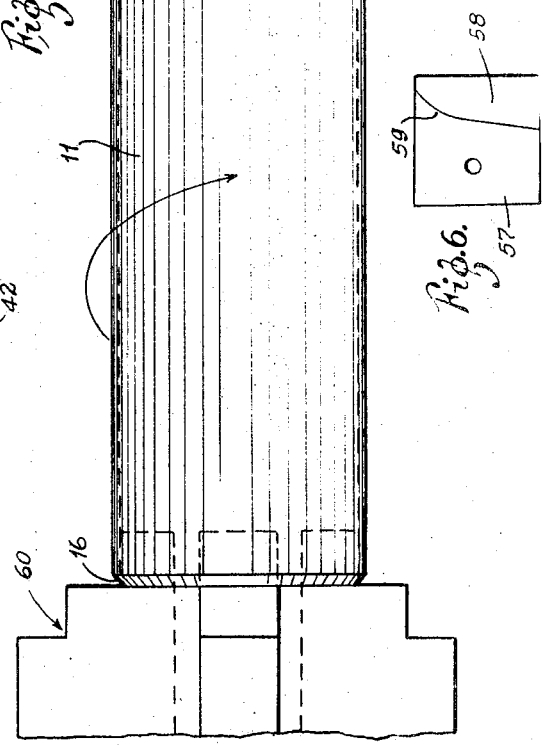
INVENTOR:
ORVILLE MITCHELL
BY Kingsland, Rogers, Ezell, Eilers & Robbins
ATTORNEYS 3,545,063
METHOD OF ASSEMBLING AN EVAPORATOR HAVING A HELICAL CHANNEL
Orville Mitchell, Dallas, Tex., assignor to John E. Mitchell Company, Inc., Dallas, Tex., a corporation of Missouri
Filed Dec. 17, 1968, Ser. No. 784,369
Int. Cl. B21d 53/02
U.S. Cl. 29—157.3     7 Claims

ABSTRACT OF THE DISCLOSURE

A heat exchanger comprising concentric tubes with a helical channel for heat exchange fluid between the tubes, the channel defined by a resilient sealing member squashed between the tubes in a helical position. A method of assembling the heat exchanger by rotating one cylinder relative to the other while moving the cylinders into concentricity and simultaneously feeding the resilient strip between the cylinder.

BRIEF DESCRIPTION OF THE INVENTION

In the description of this invention, emphasis is placed upon the structure and method of assembly of an evaporator, especially one adapted to refrigerate carbonated semifrozen beverages or confections of the kind produced by the system of U.S. Pat. No. 3,403,524. In such a system, the beverage or confection product is prepared from water, flavor and carbon dioxide, and these ingredients are cooled to a desired consistency within a freezing chamber. It will be recognized, however, that the structure, method and underlying principles of this description may apply to any heat exchanger, whether heater or refrigerator.

In this invention, evaporation is accomplished by circulating a cooling fluid through a helical path. A cylindrical freezing chamber, containing the confection ingredients, forms an inner cylindrical wall. An outer tube coaxial with the freezing chamber forms an outer cylindrical wall. A resilient cord is wound in a helix between the cylindrical wall of the freezing chamber and the cylindrical wall of the outer tube. The resilient cord is pressed between these cylindrical walls to provide a fluid-tight seal and provide a lead-proof path for the flow of cooling fluid.

In an evaporator, the rate of heat removal from a product depends upon several factors, among which are the velocity of the cooling fluid and the areas of the heat transfer wall surfaces contacted by the cooling fluid and by the substance to be cooled. If the evaporator is used for freezing carbonated desserts, the internal surface of the freezing chamber must be smooth so that an appropriate agitator or scraper can scrape the frozen product away from the internal freezing surface. Because this surface must be smooth, its total surface area is minimized below the greater surface areas of rougher types of heat exchange surfaces. Therefore, in order to rapidly remove heat from the product and to carry away that heat by evaporation of refrigerant, and consequently to properly load the compressor and condenser, the heat interchange must be accomplished by a fast transfer from the freezing chamber wall into the evaporating refrigerant.

Some conventional evaporators have been constructed with copper refrigerant tubing being wound around the freezing chamber and with a matrix for making contact between the wound tubes and the cylindrical wall of the freezing chamber. Use of a matrix, particularly one of aluminum, has a serious defect in operation. When the product has reached the desired stage of consistency, that is, the proper ratio of ice particles to liquid, the refrigeration is automatically interrupted to prevent excess viscosity of the product. With a matrix incorporated, however, the matrix lags behind the refrigerant in temperature change. Consequently, when the refrigerant is cut off, the matrix continues to draw heat through the freezing chamber wall and out of the product, causing objectionable additional freezing.

The disadvantages of a matrix are avoided by the direct contact class of evaporators. In a direct contact evaporator, the refrigerant directly contacts the freezing chamber wall, and very little refrigeration takes place after the refrigerant flow has been interrupted because evaporation of the refrigerant is also immediately interrupted. The simplest type of direct contact evaporator is the flooded system in which an outer tube surrounds the freezing chamber tube and refrigerant is flooded into the space therebetween and allowed to evaporate as heat is gained by it from the product in the freezing chamber. This, however, is a relatively ineffective evaporator because the refrigerant in contact with the freezing chamber wall has a very low velocity. Velocity is an important factor in rate of heat transfer, although the velocity can become too high and cause objectionable pressure drops in the refrigerant cycle.

This invention provides direct contact evaporation with acceptably high velocity of refrigerant flow by providing a helical path for the refrigerant. The helical path is provided by winding a resilient cord in a helix about a cylindrical freezing chamber and within an outer cylinder to define a helical channel between the two cylinders. It is difficult to provide a helical channel between the freeze chamber and the outer cylinder or tube because the helical wall which defines the helical channel must seal against both the inner chamber wall and the outer tube. Otherwise refrigerant bypasses with consequent loss in velocity. Efforts to wind a resilient helical member in a helix about the freeze chamber followed by pressing the outer tube in place result in telescoping the turns of the helix. The helix may be uniform or gradually expanding to maintain substantially uniform velocity of the heat exchange fluid.

In the present invention, the method of making the evaporator with a helical refrigerant path is very simple and effective. Two cylinders of different diameters are axially aligned with the leading end of the larger cylinder concentric with the trailing end of the smaller cylinder. The diameters of the cylinders are such that an annular space is present between the concentric portions of the cylinders. An end of a resilient strip is positioned between the overlapping concentric ends of the cylinders and is clamped to the outer cylinder. The strip is thicker than the width of the space between the concentric portions of the cylinders so its end must be forced between the cylinders and is squashed when in place. Preferably, the resilient strip has a circular cross-section and is made of natural or synthetic rubber.

With the end of the strip now clamped and held between the overlapping concentric ends of the cylinders, one of the cylinders is rotated relative to the other cylinder while the cylinders are simultaneously moved into axial concentricity. At the same time, the resilient strip is fed into the space between the cylinders. The result is to wind the resilient strip between the cylinders in a uniform helical path.

Since this method of winding the resilient strip between the cylinders tends to streach the resilient strip, and since it is important to maintain a fluid seal between the resilient strip and each cylinder, it is preferable after completing the helical winding of the strip to rotate the cylinders through a small arc relative to one another in the opposite direction to the direction of helical winding. This reverse rotation tends to unstretch the resilient strip to squash it more firmly between the two cylinders, assuring a fluid-tight seal.

With a given pressure drop through the evaporator, the refrigerant flows at a high velocity and the helical routing offers low resistance to flow.

BRIEF DESCRIPTION OF THE DRAWINGS

FIG. 1 is a side elevation view of the evaporator with parts shown in section.

FIG. 2 is a view in longitudinal medial section taken through the axis of the evaporator.

FIG. 3 is an enlarged view in section taken along the line 3—3 of FIG. 2.

FIG. 4 is an enlarged fragmentary view in section of the upper lefthand corner of the evaporator as shown in FIG. 2.

FIG. 5 is a side elevation view on a reduced scale showing the assembly of the evaporator, with parts shown in section.

FIG. 6 is a rear elevation view of a clamping shoe.

DETAILED DESCRIPTION OF THE INVENTION

In the example described for this invention, there is a product dispensing assembly 10 having a stainless steel freeze cylinder 11 closed at its ends by front and rear walls 12 and 13. The front and rear walls 12 and 13 have annular grooves 14 and 15 for receiving the ends 16 of the cylinder 11. As shown in FIG. 4, each of these ends 16 of the cylinder 11 is tapered and is pressed against an O-ring 17 to provide a fluid-tight seal. The end walls 12 and 13 are held in place by a plurality of rods 18 extending between the walls 12 and 13, with nuts 19 threaded onto the ends of the rods. A drink or confection product chamber 20 is provided between the end walls 12 and 13 and the inner surface 21 of the freeze cylinder 11. The outer surface 22 of the cylinder 11 is exposed to refrigerant fluid as will be described. The inner surface 21 is polished smooth. The outer surface 22 may be smooth also.

An outer cylinder or tube 25 is of larger diameter than the freeze cylinder 11 and is mounted coaxially with the freeze cylinder 11. The ends 26 of the outer tube 25 abut against a pair of end plates 27 and 28. There are O-ring seals 29 and 30 squashed between the freeze cylinder 11 and the outer tube 25 and pressed against the end plates 27 and 28, as particularly shown in FIG. 4. The spacial area 31 between the freeze cylinder 11 and the outer tube 25 is where refrigerant is circulated in a manner to be described.

A housing jacket 32 of larger diameter than that of the outer tube 25 surrounds the outer tube 25. The ends of the housing jacket 32 are mounted on the front and rear end plates 27 and 28. A pair of front and rear retainer plates 33 and 34 bear against the ends of the housing jacket 32 and against the end plates 27 and 28. The end plates 27 and 28 are located and held in position between the ends 25 and 26 of the outer tube 25 and the retainer plates 33 and 34. The retainer plates 33 and 34 are held in place by nuts 35 threaded onto the rod 18, as particularly shown in FIG. 4. The area between the outer tube 25 and the housing jacket 32 is filled with insulation (not shown).

An elongated yieldable sealing member 38 is wound in a helix in the space between the freeze cylinder 11 and the outer tube 25. The sealing member 38 is of round cross-section and is of elastomeric composition of the same material as conventional O-rings. Its uncompressed diameter is greater than the radial distance between the freeze cylinder 11 and the outer tube 25 so that when the sealing member 38 is positioned in place as illustrated in FIG. 2, it is somewhat compressed. Typically, the diameter of the sealing member 38 is 0.270 inch and the width of the space 31 is ¼ inch. The ends 39 and 40 of the sealing member 38 terminate short of the O-ring seals 29 and 30. A helical channel 41 between the freeze cylinder 11 and the outer tube 25 is defined by the sealing member 38.

An inlet tube 42 is welded to an opening 43 adjacent the end 16 of the freeze cylinder 11 to provide an inlet to the helical channel 41 for the flow of refrigerant. An outlet tube 44 is welded to an opening 45 in the freeze cylinder 11 adjacent the other end 16 of the freeze cylinder 11 to provide an outlet for the flow of refrigerant from the helical channel 41. The tubes 42 and 44 are connected to compressor, condenser, and expansion components (not shown), which, with the evaporator channel 11, comprise the usual components of a refrigeration system.

A product inlet tube 47 extends through the rear wall 13 into communication with the product chamber 21 to introduce product ingredients, such as water, flavor and carbon dioxide to the chamber 21. These products may be delivered together in a single inlet tube 47 or there may be additional inlet tubes for separate introduction of one or more of the product ingredients. An outlet tube 48 extends through the front wall 12 and has a suitable valve-controlled faucet 49 connected to its outer end for regulating discharge of the product after it has reached the desired consistency.

An agitator shaft 50 is rotatably journalled in bearings 51 and 52 in the end walls 12 and 13. A plurality of agitator blades (only one such blade 53 being shown for illustrative purposes) are connected to the agitator shaft 50 to agitate and stir the product within the product chamber 21 and to scrape any frozen particles from the inner wall 20 of the freeze cylinder 11.

OPERATION

Control of the supply of product ingredients to the product chamber 21 and control of operation of the refrigeration system for the circulation of refrigerant through the evaporator channel 41 may be by any desired means. For a semi-frozen carbonated beverage, the control set forth in U.S. Pat. No. 3,403,524 is suitable. Whatever control is used, the refrigerant flows through the port 42 adjacent one end of the freeze cylinder 11 to enter at one end of the helical passage 41 defined by the helically wound sealing member 38. Since the sealing member 38 is tightly pressed between the freeze cylinder 11 and the outer tube 25, it provides a seal confining the flow of refrigerant through the helical passage or channel 41. Therefore, the refrigerant flows in direct contact with the outer surface 22 of the freeze cylinder 11, eliminating the interposition of a matrix. Since the flow of refrigerant is confined to the helical channel 41, the refrigerant flows rapidly in successive contact with the entire outer surface 22 of the freeze cylinder 11 until the refrigerant finally emerges through the outlet-tube 44.

METHOD OF ASSEMBLING THE EVAPORATOR

FIG. 5 illustrates the method of assembling the freeze cylinder 11 and the outer tube 25 to wind the sealing member 38 in a helix. In this method, the sealing member 38 is first cut to the proper lenght and then its end 55 is clamped to the outer surface of the freeze cylinder 11 by a thin plate 56 welded to the freeze cylinder 11. The clamping plate 56 is thin and it squashes the end 55 of the lealing member 38 sufficiently to reuce the combined thicknesses of the squashed section of the member 38 and the clamping plate 56 to less than the width of the base 31. A shoe 57 is temporarily mounted on the outer tube 25. The shoe 57 has a lead-in guide 58 that projects inwardly from the outer tube 25 to a position nearly contacting the freeze cylinder 11. The lead-in-guide 58 has a curved edge 59 that directs the sealing member 38 into the space 31 between the outer tube 25 and the freeze cylinder 11.

Now, the freeze cylinder 11 will have been mounted and held on a rotatable chuck 60, such as a lathe chuck. The other tube 25 is guided over the end 17 of the freeze cylinder 11 within an opening 61 of a suitable stationary guide 62 and is manually or automatically (by means not shown) restrained from rotating while being axially moved to the left as viewed in FIG. 5. As the freeze cylinder 11 is rotated, therefore, the outer tube 25 is moved axially toward concentricity with the freeze cylinder 11. Simultaneously, the sealing member 38 is fed past the curved surface 59 of the lead-in guide 58 into the space 31 between the outer tube 55 and the freeze cylinder 11. Assuming the freeze cylinder 11 is about four inches in diameter, the outer tube 25 is moved axially at the rate of about 1¼ inches for each revolution of the freeze cylinder 11, winding the sealing member 38 into a uniform helix having the desired number of turns at the desired spacing. As the sealing member 38 enters the space 31, there is no tendency to displace it from its entering position because of the helical motion of the outer tube 25 relative to the freeze cylinder 11 during this assembly. This helical assembling motion presses the sealing member 38 into a helical position rather than displacing it axially.

In the foregoing assembly, the helix formed by the sealing member 38 is substantially uniform, and the evaporator thus produced performs quite satisfactorily. However, it may be desirable to wind the sealing member in a gradually expanding helix. To do so, the axial movement of the outer tube 25 is accelerated while the rotation of the inner tube is maintained at a uniform rate. The result is a gradual increase in the space between turns of the helix defined by the sealing member, and correspondingly, a gradually increasing area of the refrigerant channel from the refrigerant inlet toward the refrigerant outlet. The purpose of this gradually expanding helix is to accommodate the increased volume of the refrigerant as it changes from liquid to superheated vapor during transfer of heat from the chamber within the freeze cylinder 11.

Since the sealing member 38 is stretched somewhat during this assembly, it is preferable to reverse the rotation of the freeze cylinder 11 through an arc of a few degrees so that the friction against the sealing member 38 will relieve the tension in the sealing member 38 and squeeze the sealing member 38 more tightly within the space 31 with a resultant tight seal against the freeze cylinder 11 and the outer tube.

With the freeze cylinder, outer tube 25, and sealing member 38 completely assembled, the addition of the other components of the evaporator 10 is completed easily and quickly. The result is an evaporator that has a helical channel 41 for the flow of refrigerant from the inlet end 42 to the outlet pipe 44. This helical routing of the refrigerant produces sufficient velocity of flow of the refrigerant to effectively remove heat from the product within the chamber 20. Even though there is a pressure drop as the refrigerant flows, producing a pressure differential on opposite sides of each turn of the helically wound sealing member 38, the compressed and squashed condition of the sealing member 38 prevents any leakage past the sealing member 38. The pressure of the refrigerant maintains a tight seal of the O-rings 29 and 30 by increasing their distortion and pressing them tightly between the freeze cylinder 11 and the outer tube 25.

Various changes and modifications may be made within this invention as will be readily apparent to those skilled in the art. Such changes and modifications are within the scope and teaching of this invention as defined by the claims appended hereto.

What is claimed is:

1. A method of assembling a heat exchanger comprising the steps of providing an inner tube having a cylindrical outer surface and an outer tube having a cylindrical inner surface of greater diameter than the said outer surface, axially aligning the two tubes so that the leading end of the outer tube is concentric with the trailing end of the inner tube, providing a continuous resilient flexible strip having a thickness greater than the width of the annular space between the concentric portions of the tubes, holding the strip into position between the overlapping concentric ends of the tubes, and rotating the inner tube relative to the outer tube while moving the inner tube into axial concentricity relative to the outer tube and while winding the strip in a helical configuration between the tubes.

2. The method of claim 1 wherein the inner tube is moved into axial concentricity relative to the outer tube at an accelerating rate of speed.

3. The method of claim 1 wherein the resilient strip has a round cross-section prior to being squashed between the tubes.

4. The method of claim 1 including guiding the resilient strip into the space between the tubes during the winding step.

5. The method of claim 1 including the step of clamping an end of the strip between the tubes to start feeding of the strip.

6. The method of claim 1 wherein the rate of feeding the strip is regulated by the pull on the strip created by relative rotation of the tubes.

7. The method of claim 1 wherein the tubes are rotated relative to one another at a uniform rate of rotation.

References Cited
UNITED STATES PATENTS

| | | | |
|---|---|---|---|
| 2,915,292 | 12/1959 | Gross | 165—89X |
| 2,985,435 | 5/1961 | Gross | 165—156X |
| 3,080,150 | 3/1963 | Gross | 165—89 |
| 644,841 | 3/1900 | Allen | 29—157.3 |
| 1,964,890 | 7/1934 | Neeson | 165—156X |
| 2,599,857 | 6/1952 | Mildner | 29—157.3X |
| 2,756,032 | 7/1956 | Dowell | 165—156X |
| 3,020,026 | 2/1962 | Peeps et al. | 165—156 |
| 3,296,817 | 1/1967 | Stoelting. | |

JOHN F. CAMPBELL, Primary Examiner

D. C. REILEY, Assistant Examiner

U.S. Cl. X.R.

113—118; 165—156